Sept. 17, 1963  SHIGEO AIKI  3,103,823
CONTROL CAM MECHANISM

Filed Dec. 4, 1959  2 Sheets-Sheet 1

United States Patent Office 3,103,823
Patented Sept. 17, 1963

3,103,823
CONTROL CAM MECHANISM
Shigeo Aiki, 150 Shirohata, Kitazaki, Obu, Japan
Filed Dec. 4, 1959, Ser. No. 857,290
Claims priority, application Japan Dec. 12, 1958
2 Claims. (Cl. 74—54)

This invention relates to a control cam mechanism for an automatic zigzag sewing machine, and has for its object to provide an improved control cam assembly which may be manufactured in comparatively compact size, yet adapted for obtaining extremely large numbers of different zigzag patterns, and which can be easily handled. Another object is to provide a simple, practical and reliable arrangement for accomplishing the foregoing.

According to this invention, the control cam mechanism comprises an upper shaft of a sewing machine, a driving shaft driven from said upper shaft, a main gear fixed on said driving shaft, a plurality of small gears arranged around and meshing with said main gear, each of said small gears having a cam disc of different configuration, a cam follower adapted to co-operate with one or two of said cam discs, and means for rotating said plurality of small gears with the cam discs as an entirety around the axis of said driving shaft to alter the position of the selected cam disc for engagement with said cam follower.

The accompanying drawing will serve to illustrate specific embodiments of my invention, in order that its utility and functioning will be thoroughly appreciated. It will be understood, however, that this is by way of illustration only and is not to be taken as limiting the invention in any way.

Figure 1:
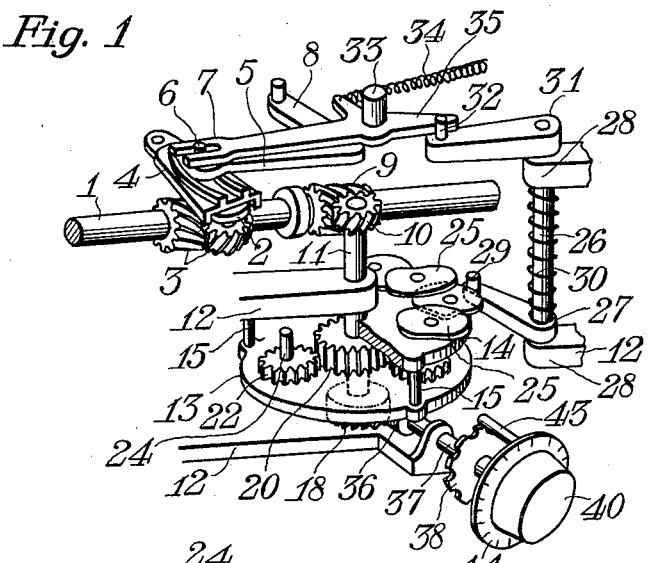
FIGURE 1 is a perspective view of the control cam mechanism for an automatic zigzag sewing machine according to this invention.
Figure 2:
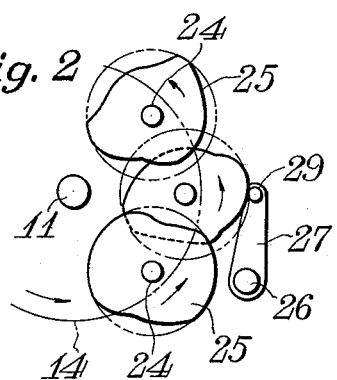
FIGURE 2 is a partial plan view of the cam assembly, showing a relative position of the cam follower in contact with one of the cam discs.
Figure 3:
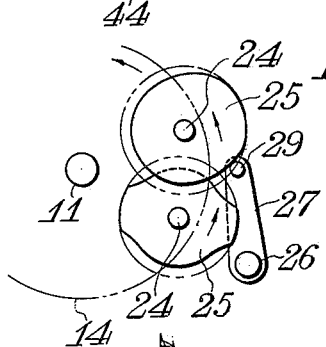
FIGURE 3 is another partial plan view of the cam assembly, showing a relative position of the cam follower in contact simultaneously with two cam discs.
Figure 6:
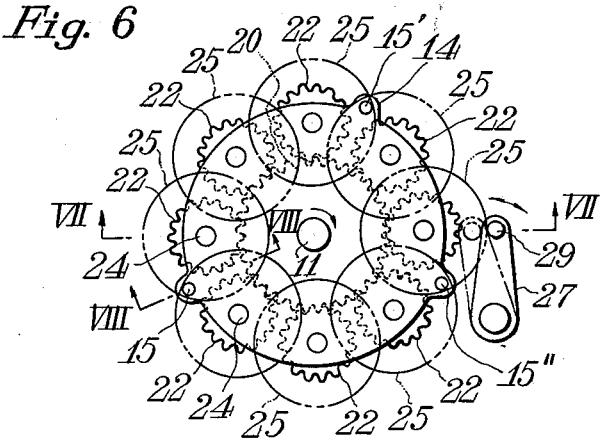
FIGURE 6 is a plan view showing arrangement of the cam assembly and the gear train shown in FIGURE 1.
Figure 7:
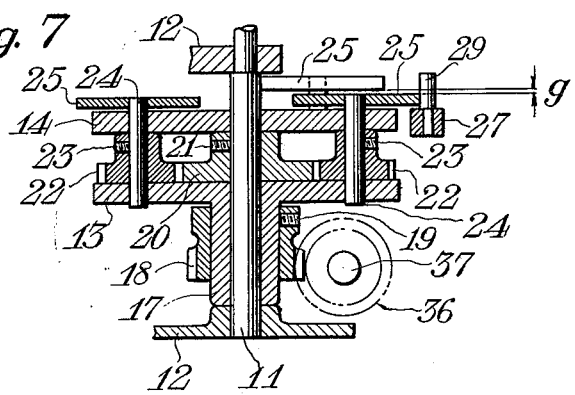
FIGURE 7 is a section taken along line VII—VII of FIGURE 6.
Figure 8:
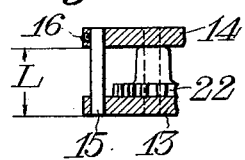
FIGURE 8 is a section taken along line VIII—VIII of FIGURE 6.

Referring to FIGURE 1, 1 designates an upper shaft of a conventional sewing machine, which drives a triangular cam 2 through a pair of hyperboloidal or skew gears 3 at a reduced speed, the ratio of reduction being ½. 4 is an oscillatable slotted arm having a guide slot on the under face thereof which is engaged by said triangular cam 2, so that on rotation of the cam 2 the arm 4 is oscillated. Said arm 4 has on its upper face an arcuate slot, with which engages a guide block (not shown) on the free end of a driving link 5. This link 5 carries a roller 6 engaging with a forked end of a zigzag with adjusting lever 7. The other end of the driving link 5 is connected to a pivoted arm 8 which is adapted for transmitting transverse oscillating motion to a needle bar (not shown) of the sewing machine. (The mechanism for transmitting the oscillatory motion to the needle bar is not shown in the drawing, as the same forms no part of the present invention.) Secured to the upper shaft 1, there is a worm 9 meshing with a worm wheel 10 on a vertical driving shaft 11, which is journalled at its lower end and a mid-point in the machine frame 12. As shown in FIGURES 6, 7 and 8, loosely mounted on said driving shaft 11, there are a lower supporting disc 13 and an upper supporting disc 14 spaced apart at a distance L and united together by means of three pins 15, 15' and 15" and set screws 16 (16' and 16"). The lower supporting disc 13 has a boss 17, to which a gear 18 is fixed by means of a screw 19. Between the lower and upper supporting discs, there is a main gear or sun gear 20 fixed on the driving shaft 11 by means of a screw 21. Meshing with and arranged around said main gear 20, there are a plurality of small gears or planetary gears 22. Each small gear 22 is fixed to a stud 24 which is loosely mounted in the supporting discs 13 and 14. Each stud 24 carries at its upper end a cam disc 25. For the purpose of arranging as many cams 25 as possible in the same circle, adjacent two cams are arranged in superposed relation as shown in FIGURE 6, leaving a small gap g therebetween, as shown in FIGURE 7. While in FIGURE 6 each cam disc 25 is shown by a chain line circle for the sake of convenience, it is to be noted that each cam disc has its peripheral cam form of different configuration, as shown in FIGURES 2 and 3. Loosely mounted in the machine frame 12 as at 28, 28, there is a vertical shaft 26 which carries at its lower end a cam follower arm 27 having a cam follower 29 at its free end. The cam follower 29 is normally biased toward the cams 25 by means of a spring 30.

Secured to the upper end of the shaft 26, there is an arm 31 having a pin 32 at its free end. The zigzag width adjusting lever 7 is pivoted around the stud 33, and its rightwardly extending arm 35 abuts against said pin 32 on the arm 31 under the action of a spring 34.

Figure 9:
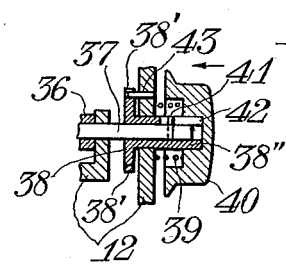
FIGURE 9 is a longitudinal section of the mount of the actuating knob shown in FIGURE 1.

A gear 36 meshing with the gear 18 is fixed onto a shaft 37 which is loosely mounted in the machine frame 12. Fixed onto the shaft 37, there is a selecting disc 38 having a plurality of radial slots 38', as shown in FIGURES 1 and 9. To said selecting disc 38 is fixed a sleeve 38" having a longitudinal slot 42, with which a pin 41 fixed on the shaft 37 engages, so that the rotation of the selecting disc 38 relative to the shaft 37 is prevented, allowing axial sliding movement of the sleeve 38" relative to the shaft 37. A knob 40 is mounted on the outer end of the sleeve 38", and is normally held slightly apart from the machine frame 12 by means of a spring 39. A pin 43 fixed to the machine frame 12 normally engages with one of the radial slots in the selecting disc 38, thereby preventing the rotation of the latter from the predetermined position.

Figure 4:
FIGURES 4 and 5 show the stitch patterns which are obtained by the cam assembly when set as shown in FIGURES 2 and 3, respectively.

The operation of this invention is as follows: The main gear 20 is driven from the upper shaft 1 through the worm 9, the worm wheel 10 and the driving shaft 11, and it drives a plurality of small gears 22 meshing therewith, thereby rotating the coaxial cam discs 25 about their respective axes at predetermined rate. When the knob 40 is pushed in the direction of arrow, FIG. 9, the selecting disc 38 is displaced leftwardly, disengaging the radial slot 38' from the fixed pin 43. Then, by manually rotating the knob 40 the shaft 37 may be rotated, so that through the gears 36 and 18 the cam assembly, including the lower supporting disc 13, the upper supporting disc 14 and all parts supported thereby, may be rotated as an entirety, excepting the driving shaft 11 and the main gear 20, so that a desired one of the cam discs 25 may be selected for engagement with the cam follower 29. When the selected one of the cam discs 25 is positioned into engagement with the follower 29, the rotation of the knob 40 is stopped. Then, the knob 40 returns to the normal position by the action of the spring 39, bringing the selecting disc 38 in engagement with the fixed pin 43, so that the cam assembly, including the lower and upper supporting discs 13, 14, will be held stationary. The knob 40 is provided with a peripheral flange bearing appropriate marks 44 for selction of one of the cam discs 25 for engagement with the cam follower 29. For example, when such position as shown in FIGURE 2 is selected, the periphery of the selected one of the cam discs 25 will be held engaged by the cam follower 29 and, by virtue of the phase displacement, the cam follower arm 27, the shaft 26 and the arm 31 will be oscillated, whereby the pin 32 will transmit the oscillatory movement to the arm 35 of the zigzag width adjusting lever 7. The forked end of the said lever 7 is swung around the pivot 33, and it will influence the movement of the driving link 5 which serves to transmit the transverse oscillatory motion to the needle bar through the arm 8. FIGURE 4 shows the zigzag pattern obtained by the arrangement of the cam assembly positioned as shown in FIGURE 2.

Figure 5:

When such position of the cam discs 25 as shown in FIGURE 3 is selected by manipulating the knob 40 in the above mentioned manner, the combined effect derived from the selected two cam discs 25 will result in forming such zigzag pattern as shown in FIGURE 5.

From the foregoing it will be noted that according to the present invention the cam assembly comprises the main gear 20, and a plurality of small gears 22 arranged around and meshing with said main gear in a planetary gear fashion, each small gear 22 carrying the cam disc 25 of different configuration, and that said cam assembly is arranged in such manner that it may be rotated in unison about the axis of said main gear 20 to a desired selected position relative to the cam follower, while each cam disc may be individually rotated on its own axis for controlling the zigzag motion of the needle bar. By such arrangement, the mechanism may be readily handled and may be manufactured comparatively in compact size, yet adapted for obtaining extremely large numbers of different zigzag patterns.

What I claim is:

1. A controlling cam mechanism for an automatic zigzag sewing machine having a frame, an upper shaft having a worm and comprising, a driving shaft journaled in said machine frame and having a worm wheel meshing with said upper shaft worm and driven thereby from said upper shaft, a sun gear fixed on said driving shaft, upper and lower supporting discs rotatably mounted on said driving shaft and axially spaced thereon, a plurality of studs journaled in said upper and lower supporting discs, a plurality of cam discs each fixed on a respective one of said studs, a plurality of planetary gears each connected to a respective stud and disposed meshing with said sun gear for selective rotation about said sun gear and driven therefrom for rotatably driving a respective cam disc, each of said cam discs having a peripheral configuration different from the other cam discs, a vertical shaft journaled in said frame, a cam follower arm carried by said vertical shaft journaled in the machine frame and having a cam follower disposed to cooperate with said discs individually, selection means for variably selecting and changing the zigzag pattern of the machine comprising a control shaft rotatably supported in said machine frame for selectively positioning a given cam disc for individual engagement with said cam follower, a knob on said shaft for selectively rotating it, coupling means comprising a gear mounted on said lower disc and a gear on said control shaft for operatively connecting said selection means to a supporting disc for rotating said upper and lower supporting discs together with said plurality of planetary gears and cam discs as entirety around said driving shaft and sun gear to engage a given cam disc with said cam follower.

2. A controlling cam mechanism for an automatic zigzag sewing machine having a frame, an upper shaft having a worm and comprising, a driving shaft journaled in said machine frame and having a worm wheel meshing with said upper shaft worm and driven thereby from said upper shaft, a sun gear fixed on said driving shaft, upper and lower supporting discs rotatably mounted on said driving shaft and axially spaced thereon, a plurality of studs journaled in said upper and lower supporting discs, a plurality of cam discs each fixed on a respective one of said studs, a plurality of planetary gears each connected to a respective stud and disposed meshing with said sun gear for selective rotation about said sun gear and driven therefrom for rotatably driving a respective cam disc, each of said cam discs having a peripheral configuration different from the other cam discs, a vertical shaft journaled in said frame, a cam follower arm carried by said vertical shaft journaled in the machine frame and having a cam follower disposed to cooperate with said cam discs individually, selection means for variably selecting and changing the zigzag pattern of the machine comprising means rotatably supported in said machine frame for selectively positioning a given cam discs for individual engagement with said cam follower, and coupling means operatively connecting said selection means to a supporting disc for rotating said upper and lower supporting discs together with said plurality of planetary gears and cam discs as an entirety around said driving shaft and sun gear to engage a given cam disc with said cam follower.

References Cited in the file of this patent

UNITED STATES PATENTS

| | | |
|---|---|---|
| 1,540,894 | Miller | June 9, 1925 |
| 1,943,118 | Holmes | Jan. 9, 1934 |
| 3,039,323 | Mori | June 19, 1962 |